US007639433B1

(12) United States Patent
Chen et al.

(10) Patent No.: US 7,639,433 B1
(45) Date of Patent: Dec. 29, 2009

(54) FIXED-FOCUS LENS

(75) Inventors: Hsin-Te Chen, Hsinchu (TW);
Kuo-Chuan Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/331,716

(22) Filed: Dec. 10, 2008

(30) Foreign Application Priority Data

Sep. 3, 2008 (TW) ............................... 97133817 A

(51) Int. Cl.
*G02B 9/60* (2006.01)
*G02B 9/34* (2006.01)
(52) U.S. Cl. ...................................... 359/770; 359/781
(58) Field of Classification Search ................. 359/770, 359/781, 783
See application file for complete search history.

(56) References Cited

U.S. PATENT DOCUMENTS

| 5,153,779 | A | 10/1992 | Ohashi |
| 5,499,142 | A | 3/1996 | Ohshita |
| 5,706,141 | A | 1/1998 | Abe |
| 5,724,191 | A | * 3/1998 | Kouthoofd ................... 359/679 |
| 5,933,286 | A | 8/1999 | Yamada et al. |
| 6,057,971 | A | 5/2000 | Mihara |
| 6,222,685 | B1 | 4/2001 | Yamada |
| 6,229,962 | B1 | 5/2001 | Imamura |
| 6,633,436 | B2 | 10/2003 | Wada et al. |
| 7,095,569 | B2 | 8/2006 | Rege et al. |

* cited by examiner

*Primary Examiner*—William C Choi
(74) *Attorney, Agent, or Firm*—J.C. Patents

(57) ABSTRACT

A fixed-focus lens including a first lens, a second lens, a cemented lens, an aperture stop, and a fifth lens is provided. The first lens disposed between an object side and an image side has a negative refractive power. The second lens disposed between the first lens and the image side has a positive refractive power. The cemented lens is disposed between the second lens and the image side. The cemented lens consists of a third lens and a fourth lens arranged in sequence from the object side to the image side. One of the third lens and the fourth lens has a positive refractive power, and the other has a negative refractive power. The aperture stop is disposed between the fourth lens and the image side. The fifth lens disposed between the aperture stop and the image side has a positive refractive power.

5 Claims, 8 Drawing Sheets

FIXED-FOCUS LENS

CROSS-REFERENCE TO RELATED APPLICATION

This application claims the priority benefit of Taiwan application serial no. 97133817, filed on Sep. 3, 2008. The entirety of the above-mentioned patent application is hereby incorporated by reference herein and made a part of specification.

BACKGROUND OF THE INVENTION

1. Field of the Invention

The present invention generally relates to a lens, and more particularly, to a fixed-focus lens.

2. Description of Related Art

The fixed-focus lens is a common optical component of an optical system, which may be used in a wide variety of applications including applications in video surveillance cameras, car cameras, back projection televisions, lenses in mobile phones, or the like. Following the development of optoelectronic technology, high quality video surveillance cameras are being more and more widely used. A high quality video surveillance camera not only may survey the ambient environment during daytime or when light is sufficient, but also has an infrared night-vision function to survey the ambient environment when light is insufficient.

In addition to having a wide angle of view to survey a large environment area, the high quality video surveillance camera is also desired to have a short and small profile to avoid affecting the appearance of the environment to thereby increase customer's willingness to buy. However, a typical five-lens fixed-focus lens used in a video surveillance camera usually has an f-number too large to use at dark night. This type of fixed-focus lens usually has an aperture stop disposed between a second lens and a third lens counted from the object side. In addition, the fixed-focus lens consisting of the five lenses usually uses at least one aspheric lens for aberration correction. However, aspheric lenses are usually difficult to fabricate and have a high cost, which makes it difficult to reduce the cost of fixed-focus lens.

SUMMARY OF THE INVENTION

Accordingly, the present invention is directed to a fixed-focus lens with low cost as well as good optical characteristics.

One embodiment of the present invention provides a fixed-focus lens including a first lens, a second lens, a cemented lens, an aperture stop, and a fifth lens. The first lens is disposed between an object side and an image side, and has a negative refractive power. The second lens is disposed between the first lens and the image side and has a positive refractive power. The cemented lens is disposed between the second lens and the image side, and consists of a third lens and a fourth lens arranged in sequence from the object side to the image side. One of the third lens and the fourth lens has a positive refractive power, and the other of the third lens and the fourth lens has a negative refractive power. The aperture stop is disposed between the fourth lens and the image side. The fifth lens is disposed between the aperture stop and the image side, and has a positive refractive power. Each of the first, second, third, fourth, and fifth lens is a spherical lens. An effective focal length (EFL) of the fixed-focus lens is f, and an axial distance between a surface of the first lens that faces the object side and a surface of the third lens that faces the object side is d, and $2.1 < d/f < 2.9$.

The fixed-focus lens of the embodiments of the present invention completely uses spherical lenses and therefore the cost thereof is reduced. In addition, in the fixed-focus lens of the embodiments of the present invention, the aperture stop is disposed between the fourth lens and the fifth lens, and by further elaborately designing the refractive power of each of the first to fifth lenses, the fixed-focus lens may thus have a small f-number. As such, the fixed-focus lens may be adapted to a night environment.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the aforementioned and other features and advantages of the present invention more comprehensible, embodiments accompanied with figures are described in detail below.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
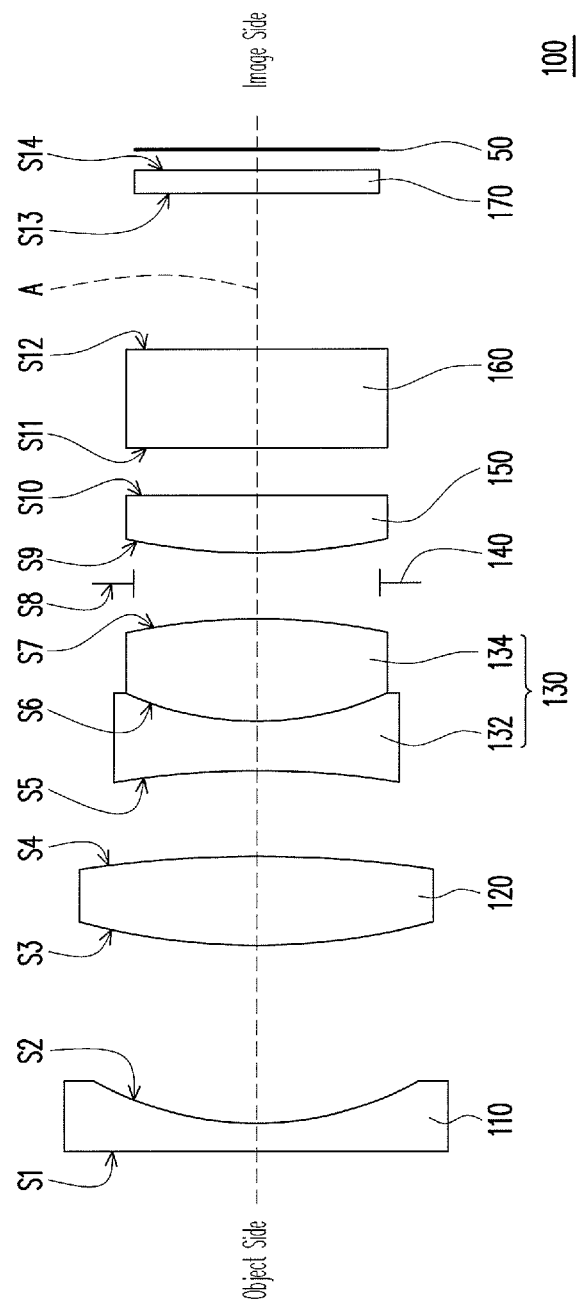
FIG. 1 is a schematic view of a structure of a fixed-focus lens according to one embodiment of the present invention.

FIG. 1 is a schematic view of a structure of a fixed-focus lens according to one embodiment of the present invention. Referring to FIG. 1, the fixed-focus lens 100 of the present embodiment includes a first lens 110, a second lens 120, a cemented lens 130, an aperture stop 140, and a fifth lens 150. The first lens 110 is disposed between an object side and an image side, and has a negative refractive power. In the present embodiment, the first lens 110 is, for example, a plane-concave lens with a concave surface facing the image side. The second lens 120 is disposed between the first lens 110 and the image side, and has a positive refractive power. In the present embodiment, the second lens 120 is, for example, a biconvex lens. The cemented lens 130 is disposed between the second lens 120 and the image side. The cemented lens 130 consists of a third lens 132 and a fourth lens 134 arranged in sequence from the object side to the image side. One of the third lens 132 and the fourth lens 134 has a positive refractive power, and the other of the third lens 132 and the fourth lens 134 has a negative refractive power. In the present embodiment, the third lens 132 has a negative refractive power, and the fourth lens 134 has a positive refractive power. Specifically, for example, the third lens 132 is a biconcave lens, and the fourth lens 134 is a biconvex lens.

The aperture stop 140 is disposed between the fourth lens 134 and the image side. The fifth lens 150 is disposed between the aperture stop 140 and the image side, and has a positive refractive power. In the present embodiment, the fifth lens 150 is, for example, a plane-convex lens with a convex surface facing the object side. In addition, each of the first, second, third, fourth, and fifth lenses 110, 120, 132, 134, 150 is a spherical lens.

In general, an optical sensor 50 may be disposed at the image side. An image of an object positioned at the object side may be formed on the optical sensor 50 through the fixed-focus lens 100. The optical sensor 50 is, for example, a charge coupled device (CCD) sensor or a complementary metal-oxide-semiconductor (CMOS) sensor. In addition, an effective focal length of the fixed-focus lens 100 is f, an axial distance (i.e., the distance on the optical axis A of the fixed-focus lens 100) between a first surface S1 of the first lens 110 that faces the object side and a fifth surface S5 of the third lens 132 that faces the object side is d, and the fixed-focus lens 100 satisfies the condition: 2.1<d/f<2.9.

In the present embodiment, the fixed-focus lens 100 described above may have an angle of view (2ω) larger than or equal to 52 degrees. In other words, the fixed-focus lens 100 has a relatively wide angle of view, such that a larger area may be surveyed when the fixed-focus lens 100 is applied in a video surveillance camera. In addition, the fixed-focus lens 100 of the present embodiment only uses five lenses and therefore has a small size. Besides, in the construction illustrated above, the aperture stop 140 is disposed between the fourth lens 134 and the fifth lens 150, and therefore the f-number of the fixed-focus lens 100 may be larger than or equal to 2.06; i.e., a minimum of the f-number is 2.06, so that a large quantity of light may enter the fixed-focus lens 100 of the present embodiment. Thus, the fixed-focus lens 100 of the present embodiment is suitable for surveillance cameras or video surveillance cameras with night-vision function.

Furthermore, all the lenses used in the fixed-focus lens 100 of the present embodiment are spherical lenses instead of aspheric lenses, thereby reducing the cost of the fixed-focus lens 100. Moreover, the refractive powers of the first to fifth lenses 110, 120, 132, 134, 150 of the fixed-focus lens 100 of the present embodiment are negative, positive, negative, positive, positive powers, respectively. Under this architecture, in order to obtain a large tolerance in lens design, the refractive effects resulted from the refractive power of the lenses may further be evenly distributed to each lens.

One embodiment of the fixed-focus lens 100 will be described hereinafter. It should be noted that data listed in following table 1 is not intended to limit the present invention. Appropriate modifications made to parameters or settings of the fixed-focus lens 100 without departing from the scope or spirit of the invention would be apparent to those skilled in the art upon reading the description herein, and they should be included in the scope of the present invention.

TABLE 1

| Surface | Radius of Curvature (millimeter) | Distance (millimeter) | Refractive Index | Abbe Number | Remarks |
|---------|----------------------------------|-----------------------|------------------|-------------|---------|
| S1 | Infinity | 1.00 | 1.70 | 55.53 | First Lens |
| S2 | 5.015 | 5.73 | | | |
| S3 | 13.001 | 2.50 | 1.81 | 25.43 | Second Lens |
| S4 | −36.655 | 2.95 | | | |
| S5 | −19.873 | 1.63 | 1.85 | 23.78 | Third Lens |
| S6 | 5.626 | 3.26 | 1.68 | 55.34 | Fourth Lens |
| S7 | −8.756 | 0.15 | | | |
| S8 | Infinity | 0.31 | | | Aperture Stop |
| S9 | 9.582 | 1.88 | 1.71 | 53.87 | Fifth Lens |
| S10 | Infinity | 1.50 | | | |
| S11 | Infinity | 3.05 | 1.52 | 64.17 | Filter |
| S12 | Infinity | 5.13 | | | |
| S13 | Infinity | 0.65 | 1.52 | 64.17 | Glass Cover |
| S14 | Infinity | 0.42 | | | |

In Table 1, distance represents the linear distance on the optical axis A between two adjacent surfaces. For example, the distance of surface S1 represents the linear distance on the optical axis A between the surface S1 and the surface S2. Thickness, refractive index and Abbe number of each lens in the remarks column correspond to the values of distance, refractive index and Abbe number in a corresponding row. In addition, in Table 1, the surfaces S1 and S2 are two surfaces of the first lens 110, and the surfaces S3 and S4 are two surfaces of the second lens 120. The surface S5 is a surface of the third lens 132 that faces the object side, the surface S6 is a surface connecting the third lens 132 and the fourth lens 134, and the surface S7 is a surface of the fourth lens 134 that faces the image side. The surface S8 is a surface of the aperture stop 140. The surfaces S9 and S10 are two surfaces of the fifth lens 150, the surfaces S11 and S12 are two surfaces of a filter 160, and the surfaces S13 and S14 are two surfaces of a glass cover for protecting the optical sensor 50. The distance in the row corresponding to the surface S14 represents the distance between the surface S14 and the optical sensor 50.

Settings, such as, radius of curvature and distance of each surface, have been shown in Table 1 and therefore are not repeated herein.

In addition, in the present embodiment, the fixed-focus lens 100 has an effective focal length of 5.148 millimeters, an f-number of 2.06, and a maximum angle of view of 56.2 degrees. Accordingly, it may be confirmed that the quantity of light entering the fixed-focus lens 100 indeed may be larger and the angle of view indeed may be wider.

Figure 2A:
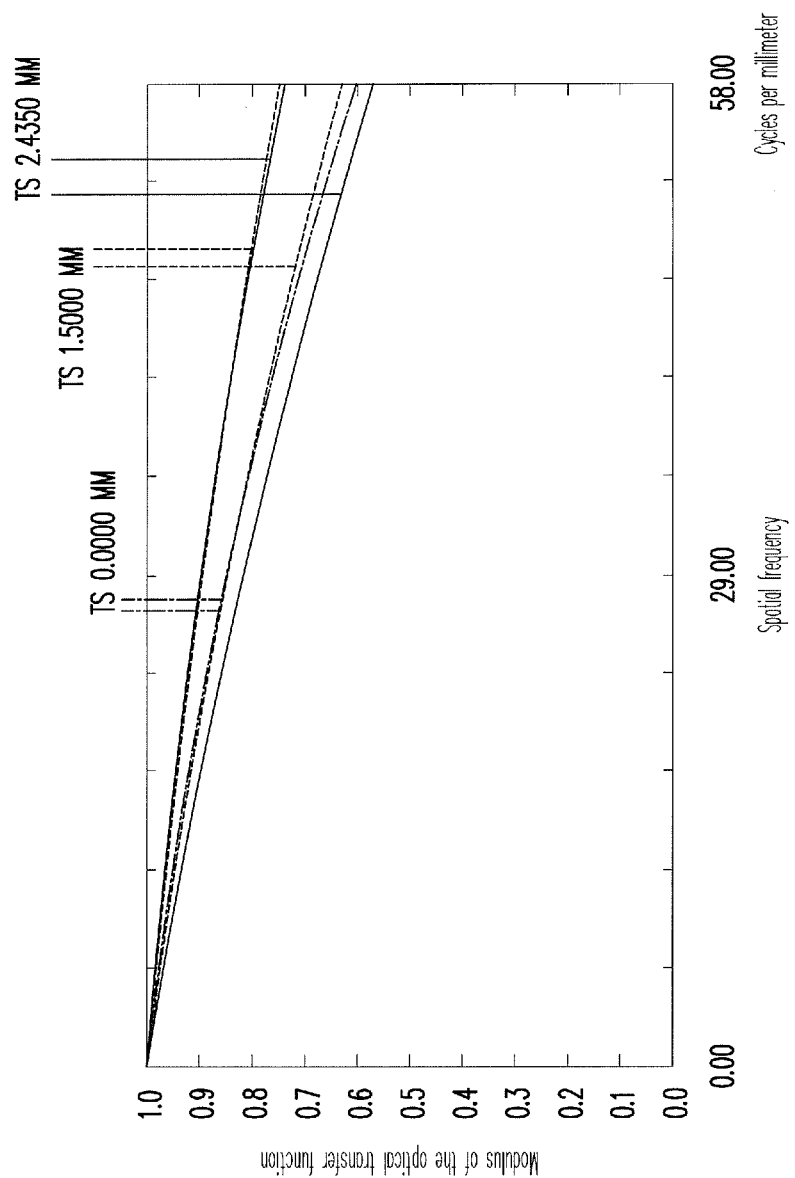
FIGS. 2A through 2C are diagrams showing optical simulation data regarding imaging of the fixed-focus lens of FIG. 1.
Figure 2B:
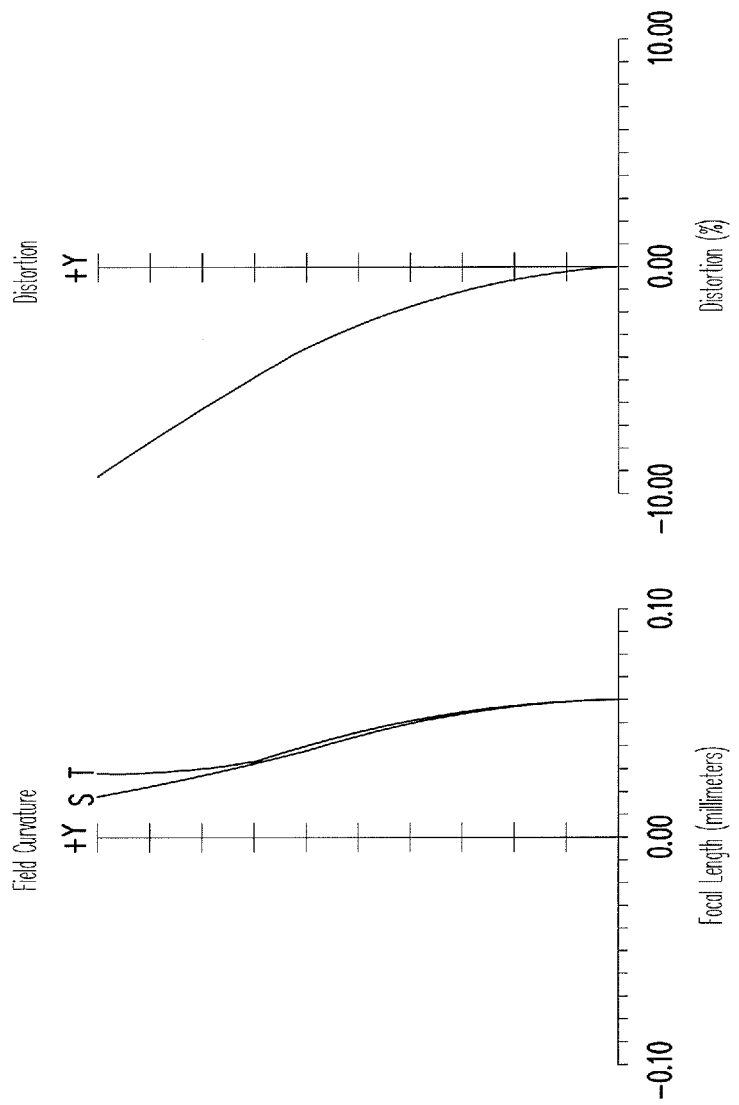
Figure 2C:
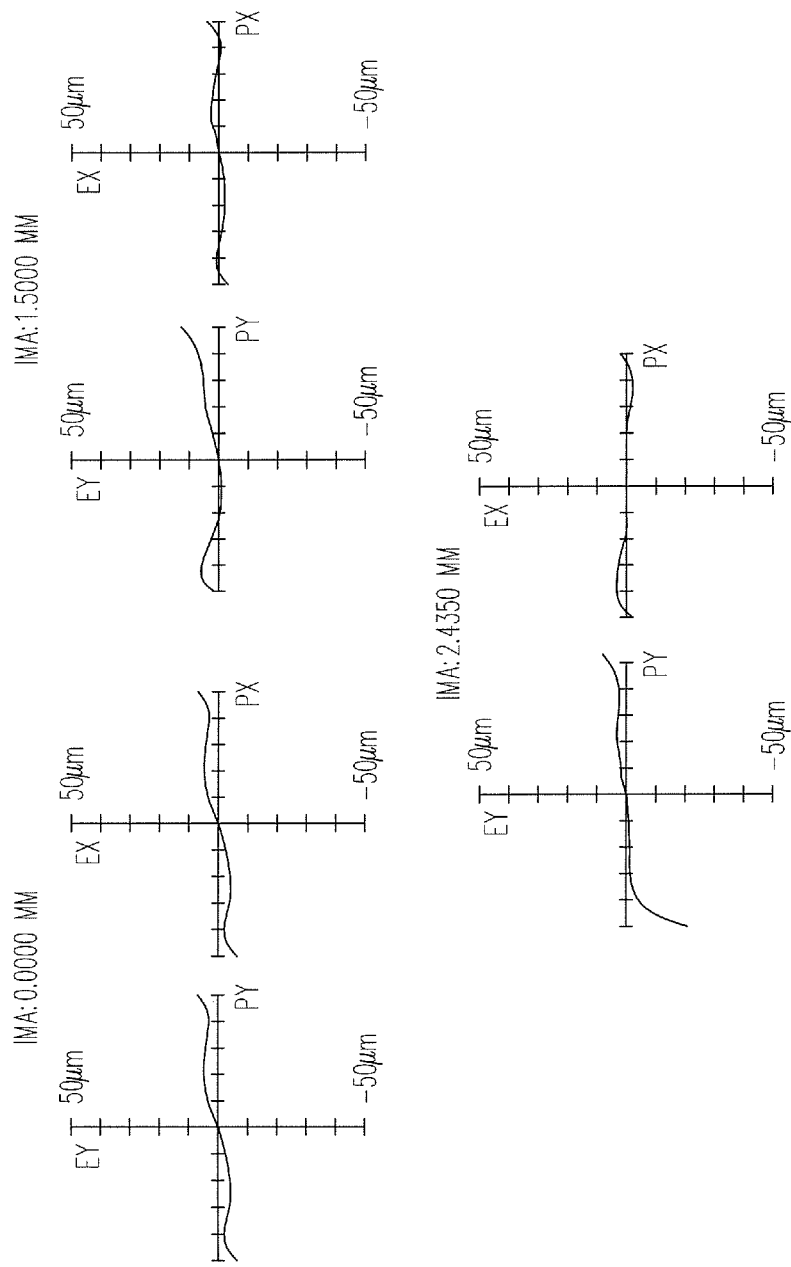

FIGS. 2A through 2C are diagrams showing optical simulation data regarding imaging of the fixed-focus lens of FIG. 1. FIG. 2A is a diagram showing the modulation transfer function (MTF), with a horizontal axis representing spatial frequency in cycles per millimeter and a vertical axis representing modulus of the optical transfer function. The data diagram of FIG. 2A is simulated for light having a wavelength ranging from 770 nanometers to 875 nanometers. In addition, FIG. 2B shows in sequence from left to right a field curvature diagram and a distortion diagram simulated for light having a wavelength of 850 nanometers. FIG. 2C is a transverse ray fan plot simulated for light having a wavelength of 850 nanometers. All the plots showing in FIGS. 2A through 2C are within the standard limits. Thus, the fixed-focus lens 100 of the present embodiment may still maintain a good imaging quality while completely using spherical lenses.

Figure 3:
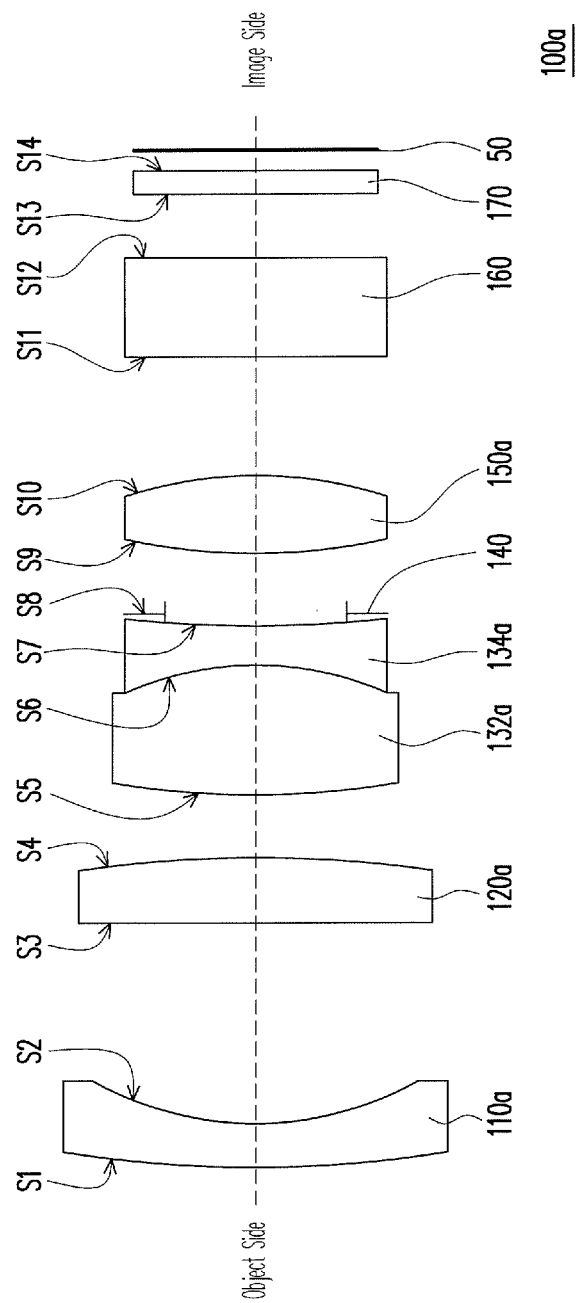
FIG. 3 is a schematic view of a structure of a fixed-focus lens according to another embodiment of the present invention.

FIG. 3 is a schematic view of a structure of a fixed-focus lens according to another embodiment of the present invention. Referring to FIG. 3, the fixed-focus lens 100a of the present embodiment is similar to the above mentioned fixed-focus lens 100 (as shown in FIG. 1) in conception, and the differences between them are described below. In the fixed-focus lens 100a of the present embodiment, a third lens 132a is of positive refractive power and a fourth lens 134a is of negative refractive power. Specifically, for example, a first lens 110a is a convex-concave lens with a convex surface facing the object side, a second lens 120a is a plane-convex lens with a convex surface facing the image side, the third lens 132a is a biconvex lens, the fourth lens 134a is a biconcave lens, and a fifth lens 150a is a biconvex lens. The fixed-focus lens 100a of the present embodiment has similar advantages and functions as described above in connection with the fixed-focus lens 100 (as shown in FIG. 1) and is not repeated herein.

One embodiment of the fixed-focus lens 100a is described below but this embodiment is not intended to limit the present invention.

TABLE 2

| Surface | Radius of Curvature (millimeter) | Distance (millimeter) | Refractive Index | Abbe Number | Remarks |
|---|---|---|---|---|---|
| S1 | 23.85 | 1.20 | 1.83 | 37.16 | First Lens |
| S2 | 4.50 | 7.61 | | | |
| S3 | Infinity | 2.50 | 1.81 | 25.43 | Second Lens |
| S4 | −8.65 | 2.23 | | | |
| S5 | 5.98 | 3.00 | 1.59 | 61.14 | Third Lens |
| S6 | −5.98 | 1.20 | 1.85 | 23.78 | Fourth Lens |
| S7 | 5.08 | 0.46 | | | |
| S8 | Infinity | 1.35 | | | Aperture Stop |
| S9 | 18.34 | 2.00 | 1.81 | 40.93 | Fifth Lens |
| S10 | −7.41 | 3.87 | | | |
| S11 | Infinity | 2.50 | 1.52 | 64.17 | Filter |
| S12 | Infinity | 1.50 | | | |
| S13 | Infinity | 0.64 | 1.52 | 64.17 | Glass Cover |
| S14 | Infinity | 0.42 | | | |

In Table 2, the surfaces S8 and S11~S14 are the same as the respective surfaces in Table 1. In addition, in Table 2, the surfaces S1 and S2 are two surfaces of the first lens 110a, the surface S3 and S4 are two surfaces of the second lens 120a. The surface S5 is a surface of the third lens 132a that faces the object side, the surface S6 is a surface connecting the third lens 132a and the fourth lens 134a, and the surface S7 is a surface of the fourth lens 134a that faces the image side. The surfaces S9, S10 are two surfaces of the fifth lens 150a.

In addition, in the present embodiment, the fixed-focus lens 100a has an effective focal length of 5.2 millimeters, an f-number of 2.1, and a maximum angle of view of 53.34 degrees. Accordingly, it may be confirmed that the quantity of light entering the fixed-focus lens 100a indeed may be larger and the angle of view indeed may be wider.

Figure 4A:
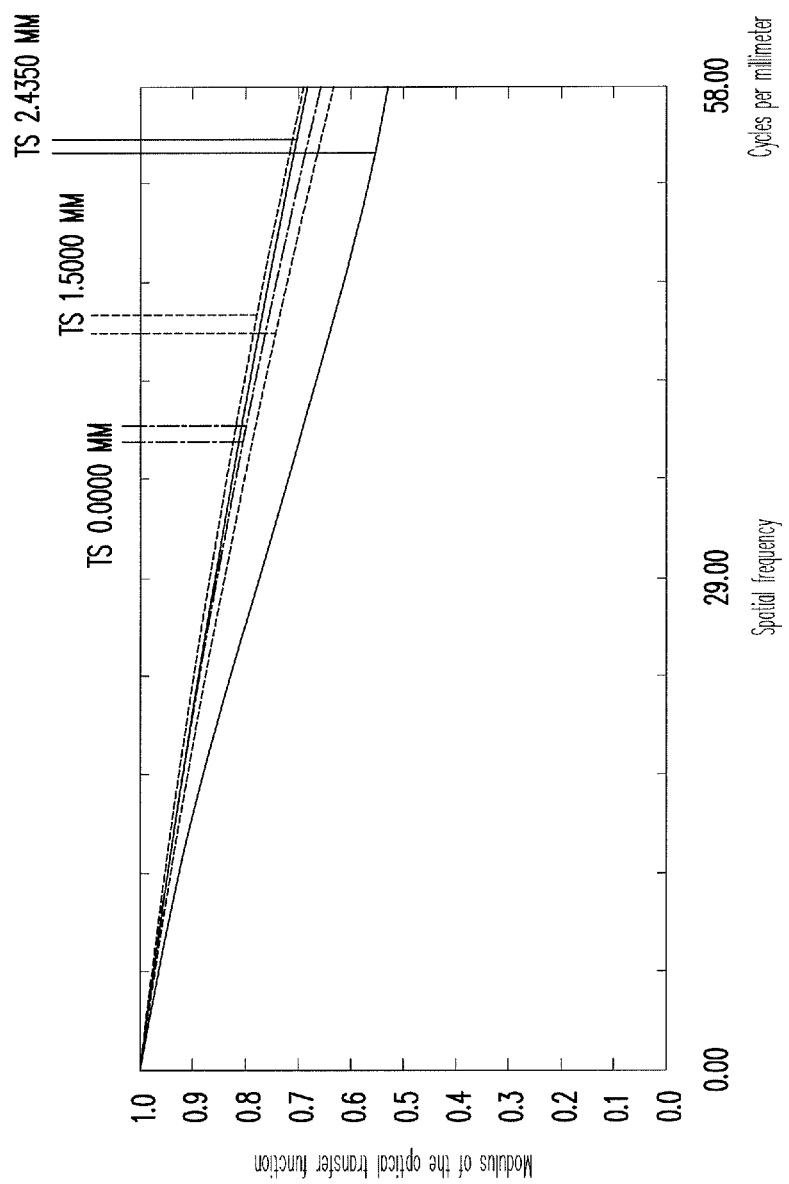
FIGS. 4A through 4C are diagrams showing optical simulation data regarding imaging of the fixed-focus lens of FIG. 3.
Figure 4B:
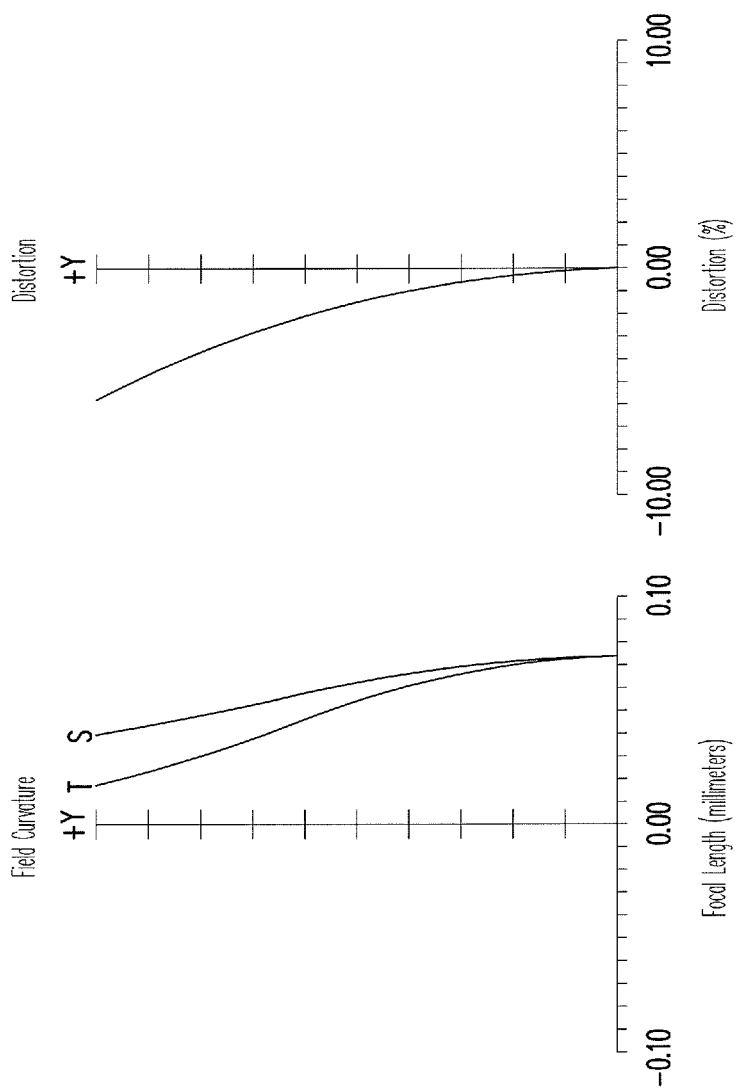
Figure 4C:
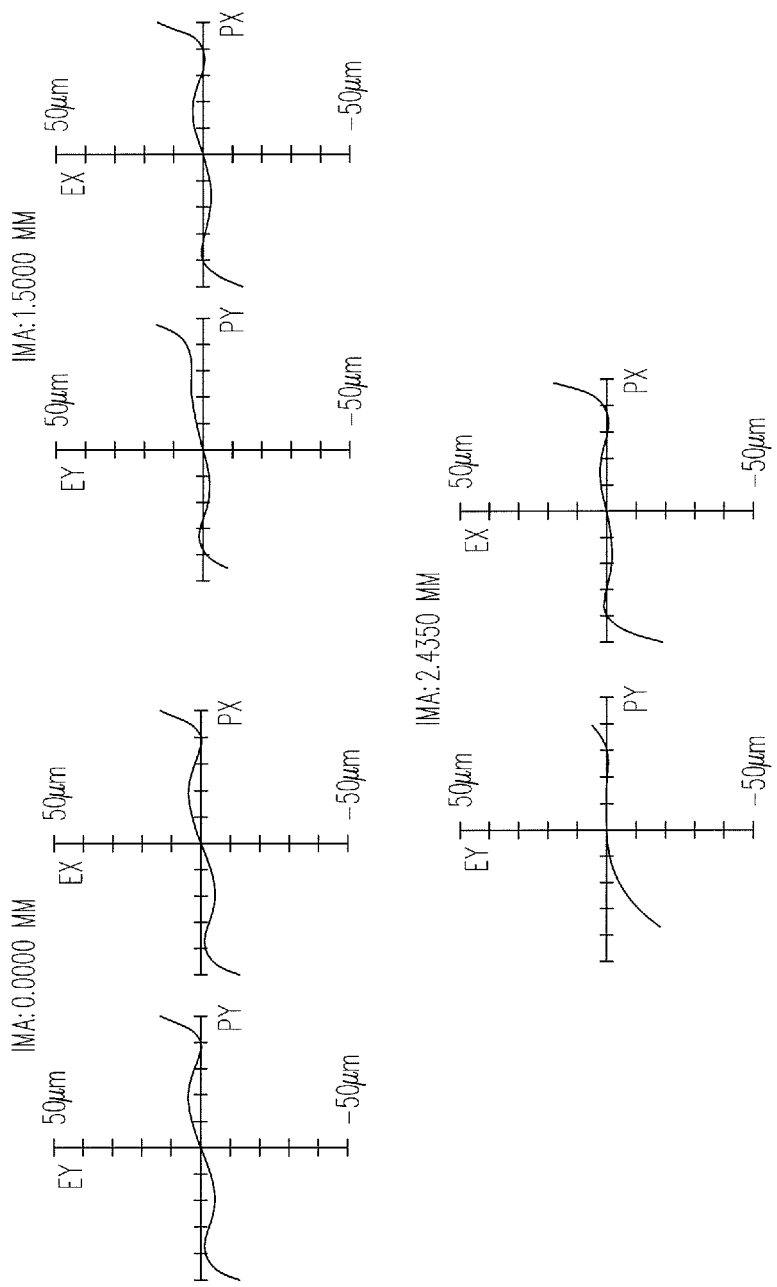

FIGS. 4A through 4C are diagrams showing optical simulation data regarding imaging of the fixed-focus lens of FIG. 3. FIG. 4A is a diagram showing the modulation transfer function, with a horizontal axis representing spatial frequency in cycles per millimeter and a vertical axis representing modulus of the optical transfer function. The data diagram of FIG. 4A is simulated for light having a wavelength ranging from 770 nanometers to 875 nanometers. In addition, FIG. 4B shows from left to right in sequence a field curvature diagram and a distortion diagram simulated for light having a wavelength of 850 nanometers. FIG. 4C is a transverse ray fan plot simulated for light having a wavelength of 850 nanometers. All the plots showing in FIGS. 4A through 4C are within the standard limits. Thus, the fixed-focus lens 100a of the present embodiment may still maintain a good imaging quality while completely using spherical lenses.

In summary, in the fixed-focus lens of the embodiments of the present invention, the aperture stop is disposed between the fourth lens and the fifth lens, and by further elaborately designing the refractive power of each of the first to fifth lenses, the fixed-focus lens may thus have a small f-number. As such, the quantity of light entering the fixed-focus lens may be increased for adaptation to a night environment. In addition, the fixed-focus lens of the embodiments of the present invention only uses five lenses and therefore has a small size. Moreover, the fixed-focus lens of the embodiments of the present invention completely uses spherical lenses instead of aspheric lenses, and therefore the cost is reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens comprising:
    a first lens disposed between an object side and an image side and having a negative refractive power;
    a second lens disposed between the first lens and the image side and having a positive refractive power;
    a cemented lens disposed between the second lens and the image side, and consisting of a third lens and a fourth lens arranged in sequence from the object side to the image side, one of the third lens and the fourth lens having a positive refractive power, and the other of the third lens and the fourth lens having a negative refractive power;
    an aperture stop disposed between the fourth lens and the image side; and
    a fifth lens disposed between the aperture stop and the image side and having a positive refractive power, wherein each of the first, second, third, fourth, and fifth lens is a spherical lens, an effective focal length of the fixed-focus lens is f, an axial distance between a surface of the first lens facing the object side and a surface of the third lens facing the object side is d, and $2.1<d/f<2.9$.

2. The fixed-focus lens according to claim 1, wherein the fixed-focus lens has an f-number larger than or equal to 2.06.

3. The fixed-focus lens according to claim 1, wherein the fixed-focus lens has an angle of view larger than or equal to 52 degrees.

4. The fixed-focus lens according to claim 1, wherein the first lens is a plane-concave lens with a concave surface facing the image side, the second lens is a biconvex lens, the third lens is a biconcave lens, the fourth lens is a biconvex lens, and the fifth lens is a plane-convex lens with a convex surface facing the object side.

5. The fixed-focus lens according to claim 1, wherein the first lens is a convex-concave lens with a convex surface facing the object side, the second lens is a plane-convex lens with a convex surface facing the image side, the third lens is a biconvex lens, the fourth lens is a biconcave lens, and the fifth lens is a biconvex lens.

* * * * *